Oct. 21, 1969

J. MEREDITH 3,473,818

SKI ATTACHMENTS FOR WHEELS

Filed June 16, 1967

INVENTOR.
JOHN MEREDITH

BY

Arne P. Fors

Agent

United States Patent Office 3,473,818
Patented Oct. 21, 1969

3,473,818
SKI ATTACHMENTS FOR WHEELS
John Meredith, 120 Lawton Blvd.,
Toronto 7, Ontario, Canada
Filed June 16, 1967, Ser. No. 646,642
Int. Cl. B62b 13/00, 19/02
U.S. Cl. 280—13                4 Claims

ABSTRACT OF THE DISCLOSURE

A miniature semi-enclosed ski for attachment to the wheel of a small wheeled vehicle such as a shopping cart to convert the cart for use in snow.

BACKGROUND OF THE INVENTION

This invention relates to new and useful improvements in ski attachments for wheels whereby the latter can be quickly and easily adapted for running on snow and ice. Although the invention of the instant application as described hereinafter is directed primarily to a runner attachment for bundle buggies or baby carriages, it is to be understood that the application of the invention is not limited to the embodiments described and claimed.

With particular reference to a bundle buggy, its use becomes difficult if not impossible once a layer of snow has accumulated on the ground because of the small wheel diameter and small tire size, the latter of which penetrates the snow covering making forward movement difficult. This has proved to be a hardship for people having no other means for taking goods to local service stores or returning groceries therefrom. One solution has been the use of a toboggan or small sled; however, the use of one of these suggested means of conveyance becomes difficult once the user reaches a stretch of bare sidewalk.

SUMMARY OF THE INVENTION

It is, therefore, an object of the present invention to provide a device for use with a bundle buggy to quickly and easily convert it for use in deep snow, slush or on ice.

The inventor has found that such an adjustable ski for use with a wheeled vehicle comprises two sidewalls in parallel configuration, a runner portion continuously affixed to the edges of said sidewalls to form a semi-enclosed structure, said runner having a recess formed in the upper surface for receiving a wheel, each of said sidewalls having an opening formed in its longitudinal edge to receive a wheel hub, means for adjustably securing said wheel within said recess, said ski having a leading edge adapted to mount perpendicular obstacles, and adjustable means for preventing rolling movement of said wheel.

DESCRIPTION OF THE DRAWINGS

The invention will now be described with reference to the accompanying drawing, in which like reference characters refer to like parts throughout the description.

DESCRIPTION OF THE PREFERRED EMBODIMENTS

Figure 1:
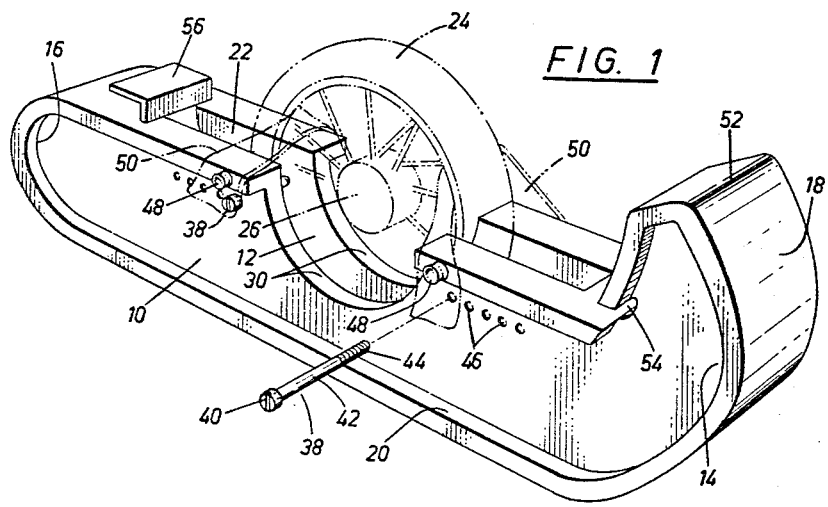
FIGURE 1 is a perspective view of the invention of the instant application illustrating its use in combination with a bundle buggy wheel.
Figure 2:
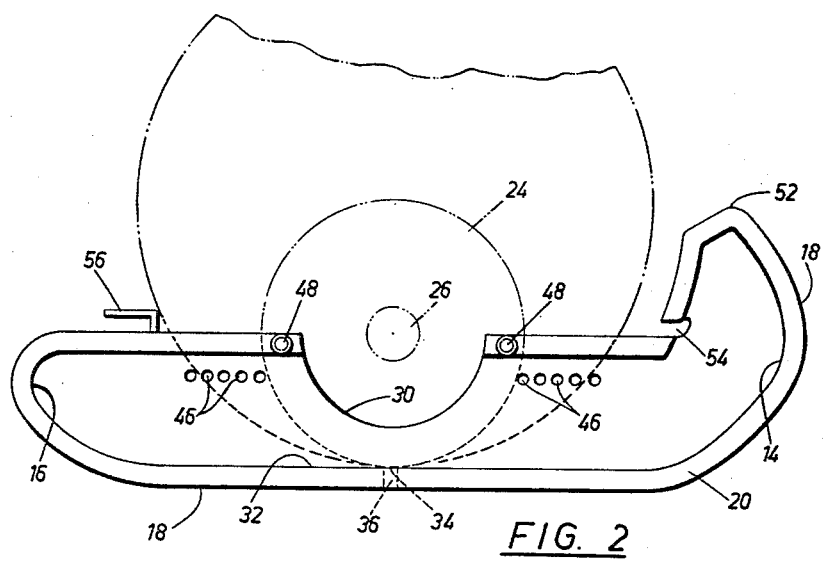
FIGURE 2 is a side elevation of the ski illustrated in FIGURE 1 showing the adjusting means.

With reference to FIGURE 1, the ski comprises two sidewalls 10 and 12 having a leading edge 14 and a trailing edge 16. A runner 18 is continuously affixed to sidewalls 10 and 12 to form a smooth running surface, and extends beyond sidewalls 10 and 12 to form a flange 20 therearound. Flange 20 has been provided to open a pathway in the snow and thereby minimize the likelihood of snow and slush coming into contact with and sticking to sidewalls 10 and 12. Recess 22 is let into runner 18 to provide admittance for buggy wheel 24 having a diameter of between 5¼ inches and 10¼ inches. Wheel 24 is mounted on an axle 26 which extends beyond the planar surface of wheel 24 to enable the mounting of the wheel by means of spokes or solid rim. It will be seen that a wheel having a diameter of 5¼ inches will have the axle abut runner 18 on its upper portion thereby preventing proper seating of wheel 24 within recess 22. To overcome this problem, opening 30 has been let into each of sidewalls 10 and 12 to permit wheel 24 to come into contact with and be properly seated on inner surface 32 of runner 18 at point 34. Also located at point 34 and passing through runner 18 is drain hole 36 to permit draining of water and snow that might collect in recess 22. Plastic pin 38 having a head 40 and a shank 42 and a threaded portion 44 is adapted for insertion into pairs of aligned holes 46, one hole of each pair being drilled in each of sidewalls 10 and 12. Domed fasteners 48 are provided on flange 20 of runner 18 for engagement with strap 50 so that a wheel having a diameter of between 5¼ inches and 10¼ inches can be secured into recess 22.

The ski has been designed in such a manner that runner 18 curves upwardly in curvilinear fashion to point 52 to provide a smooth curved leading edge to ride up and over obstacles with no more effect than a steady sustained pulling action on the handle of the bundle buggy.

When the skis are not in use, they may easily be stored on the bundle buggy. To facilitate storage, each ski has an opening 54, transverse the length of the ski, which is adapted for engaging the top wire of the bundle buggy, to suspend the ski therefrom. Bracket 56 is adapted for engaging another wire of the said bundle buggy to retain the ski in suspended condition.

In use, the user need merely tilt the buggy back to raise one wheel off the ground so that the raised wheel can be inserted into recess 22, and pins 38 are then inserted in the appropriate pairs of aligned holes 46 so that pin shank 42 will abut the edge of wheel 24 to prevent rolling movement thereof. Once this adjustment has been made to suit the wheel of the vehicle with which the ski is to be used, the adjustment need not be made again. With the wheel so situated, strap 50, having fastening elements at each end complementary to fastening elements 48 located on flange 20, is secured over a spoke of said wheel and is fixed to fastening elements 48 in such a manner that wheel 24 is secured into position within recess 22. The user repeats this procedure with the remaining wheel or wheels to ready the vehicle for use in snow or slush.

Once the skis have been adjusted to the wheel with which they are to be used, the skis can be mounted or removed in seconds by unsnapping straps 50 and lifting wheel 24 out of recess 22. The user, therefore, when pulling the buggy from his dwelling to a main thoroughfare, can quickly and easily attach the skis for travelling over the snow-covered sidewalks, and again in seconds, can remove the skis when reaching a main thoroughfare which is then free of snow. The buggy can then be used on wheels without difficulty.

The foregoing description is to be understood as being not limited to the embodiments described.

What I claim as new and desire to protect by Letters Patent of the United States is:

1. An adjustable ski for use with a wheeled vehicle which comprises two sidewalls in parallel configuration, a runner portion continuously affixed to the edges of said sidewalls to form an enclosed structure save for a recess formed in the upper surface of said structure for receiving a lower portion of a wheel, the lowermost portion of said wheel being within said enclosed structure, each of said sidewalls having an opening formed in its longitudinal edge to receive a wheel hub; a plurality of domed fasteners secured to said sidewalls adjacent said recess; and a strap having a fastener at each end complementary to said domed fasteners for releasably securing said wheel in said recess; each said sidewall being provided with a plurality of openings, each said opening in one said sidewall being aligned with a corresponding opening in the other said sidewall for receiving a connecting pin to prevent movement of said wheel along the length of said ski, said openings being arranged in a straight line along the length of each said sidewall so that lowermost portions of wheels of differing diameters may be accommodated within said enclosed structure, said ski having a leading edge adapted to mount obstacles.

2. An adjustable ski as claimed in claim 1 wherein said runner portion projects past each of said sidewalls to form a continuous flange therearound to prevent snow from coming into contact with and sticking to said sidewalls.

3. In an adjustable ski as claimed in claim 1, the leading edge of said runner portion having an upward curvilinear surface for mounting perpendicular objects.

4. In an adjustable ski as claimed in claim 1, said openings in the sidewalls adapted for engaging wheels having a diameter of from 5¼ inches to 10¼ inches.

References Cited
UNITED STATES PATENTS

| | | | |
|---|---|---|---|
| 813,231 | 2/1906 | Nightingale | 280—13 |
| 1,218,128 | 3/1917 | Swanson | 280—13 |
| 1,581,415 | 4/1926 | Adamczik | 280—8 X |
| 3,070,383 | 12/1962 | Roe | 280—13 |

BENJAMIN HERSH, Primary Examiner

J. SIEGEL, Assistant Examiner